June 7, 1938.                L. M. FRANCIS                2,119,671
                             VEHICLE BODY
                         Filed Dec. 16, 1936            3 Sheets-Sheet 1
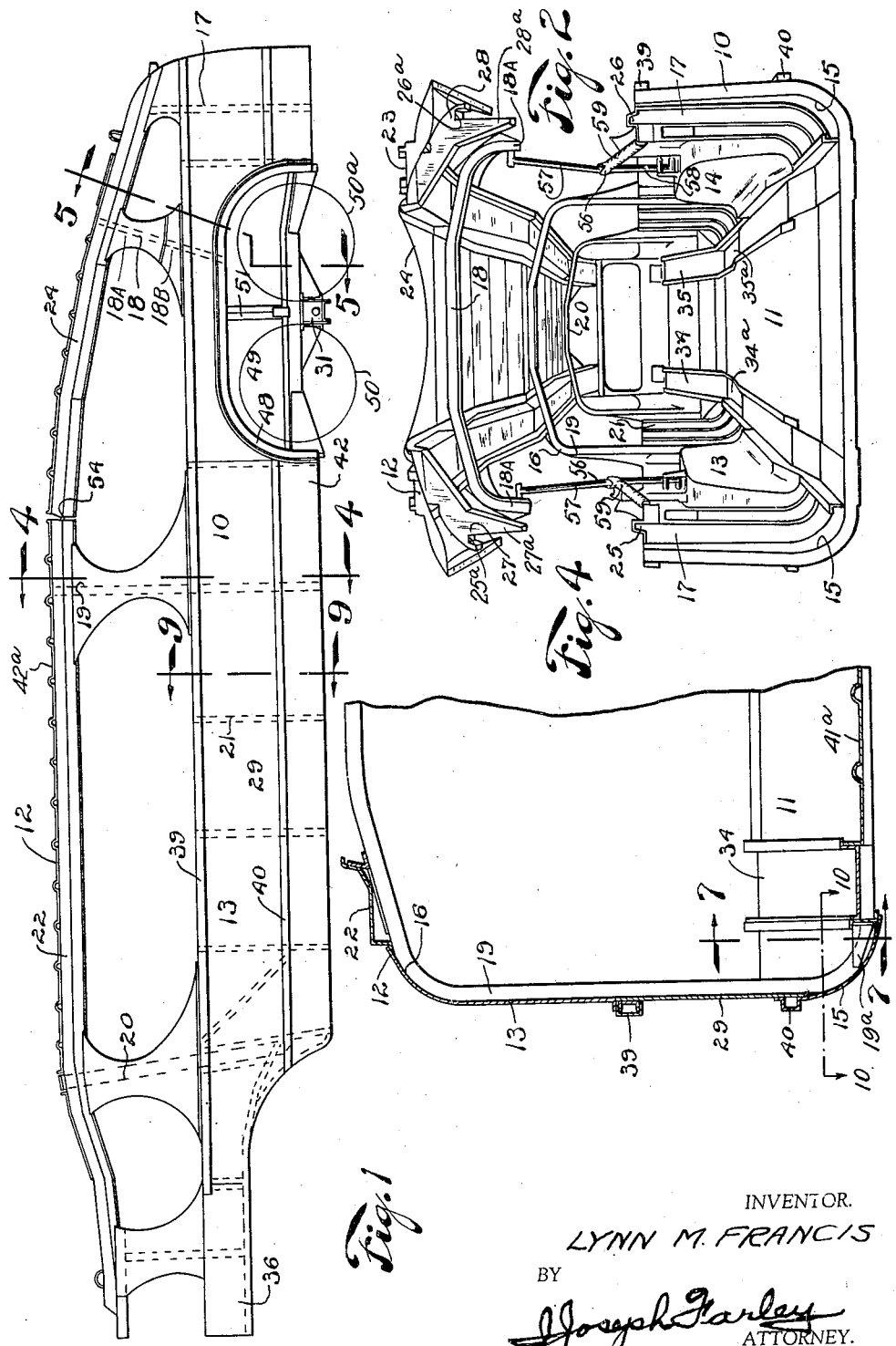
INVENTOR.
LYNN M. FRANCIS
BY
Joseph Farley
ATTORNEY.

June 7, 1938.    L. M. FRANCIS    2,119,671
VEHICLE BODY
Filed Dec. 16, 1936    3 Sheets-Sheet 2
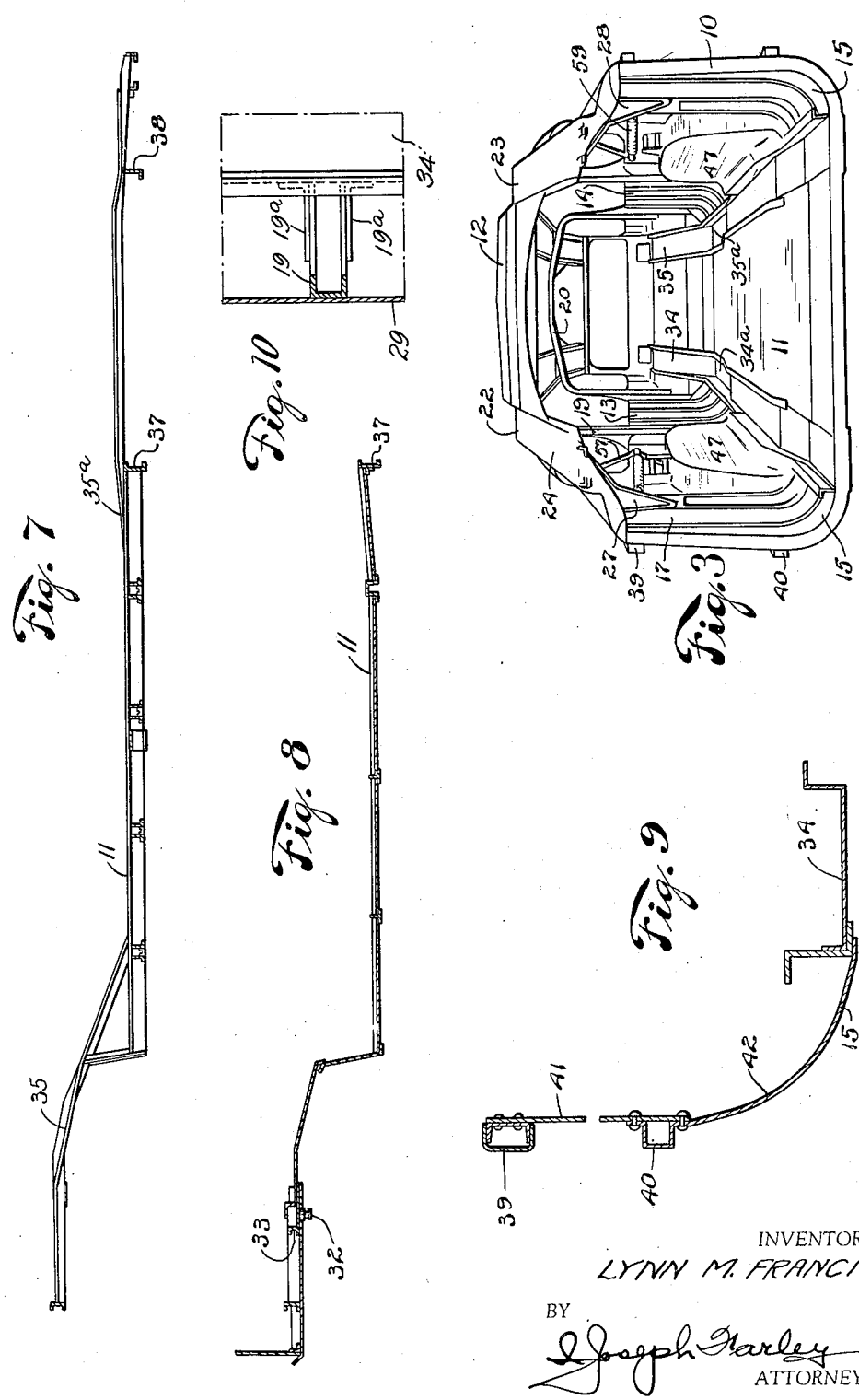
INVENTOR.
LYNN M. FRANCIS
BY
Joseph Harley
ATTORNEY.

June 7, 1938.  L. M. FRANCIS  2,119,671
VEHICLE BODY
Filed Dec. 16, 1936  3 Sheets-Sheet 3
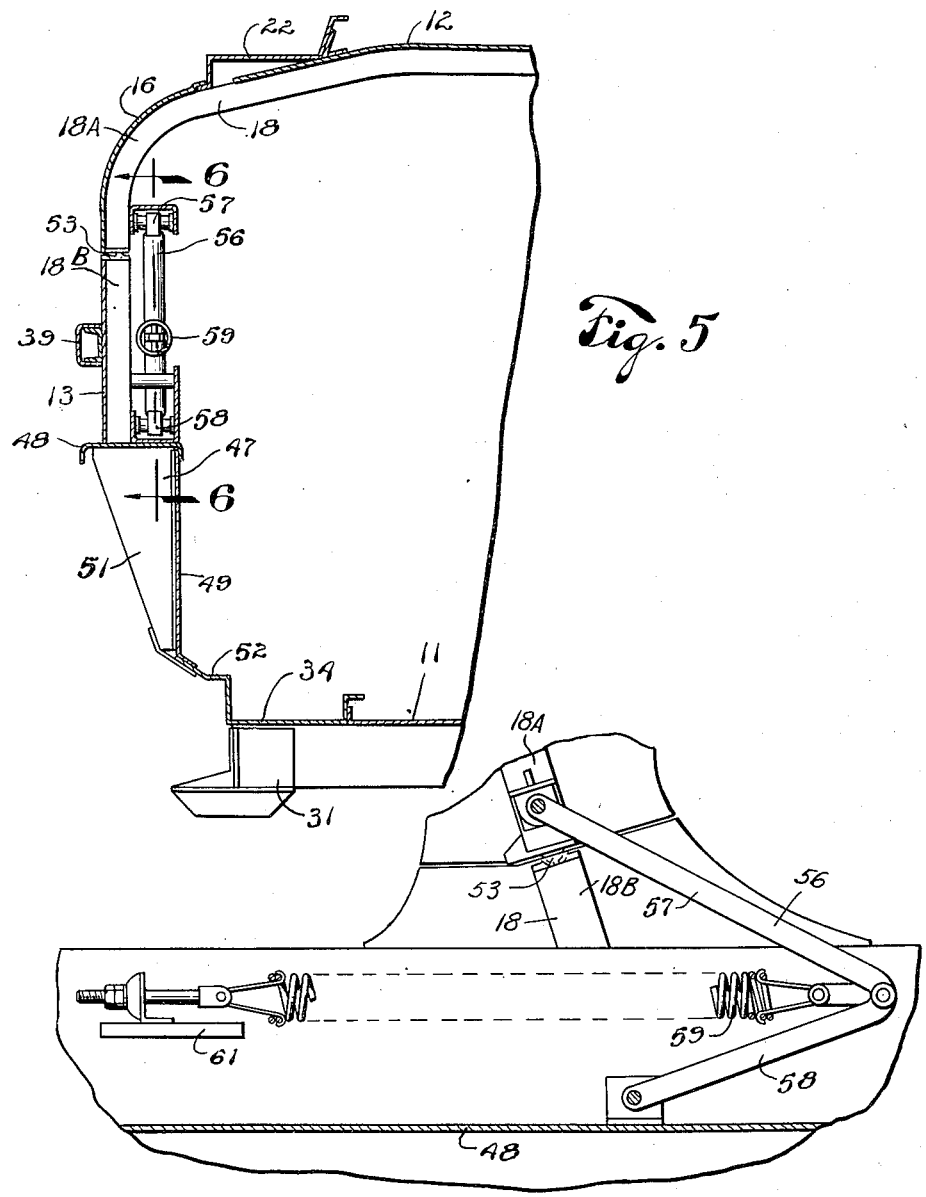
INVENTOR.
LYNN M FRANCIS
BY
Joseph Farley
ATTORNEY.

Patented June 7, 1938

2,119,671

UNITED STATES PATENT OFFICE 2,119,671

VEHICLE BODY

Lynn M. Francis, Birmingham, Mich., assignor to Mechanical Handling Systems, Inc., Detroit, Mich., a corporation of Michigan Application December 16, 1936, Serial No. 116,057

20 Claims. (Cl. 296—1)

This invention relates to vehicle bodies and pertains more particularly to the bodies of vehicles such as are used for transporting other vehicles, for example, fully assembled automobiles from the assembly plants to the dealers. The present improvement relates more particularly to the structure and arrangement of the parts of the vehicle body of this character whereby the objects of the invention are attained. The design and construction of such vehicles has taken many forms, developing originally from a type of vehicle body which consisted primarily of a long rectangular frame having upper and lower decks provided with tracks and capable of carrying cars.

Vehicles of this character, capable of carrying two cars on the lower deck and two on the upper deck, have been in use and have proven quite satisfactory but they had the disadvantage of excessive weight, complicated and rather costly construction and owing to the generally rectangular cross sectional shape of the vehicle body, the lower corners required a great deal of reinforcing, not only to support the loads of the cars being carried, but especially to resist the jars and vibrations brought upon the vehicle on the highway due to side weaving, jolts and the like, which in many cases resulted in breaking the frames or loosening the joints along the lower side edges of the body.

Recognizing these and other disadvantages which have become apparent in the use of vehicles of this kind, I have devised an improved design and structure which obviates the foregoing difficulties and has made it possible to produce a vehicle body of striking and pleasing appearance that is of exceptionally light weight and of such strength that the depreciation due to vibration and road shocks has been for all practical purposes entirely overcome.

The structural scheme which I have employed makes it possible to eliminate practically all of the diagonal reinforcing which has heretofore been considered necessary in vehicles of this class.

The primary objects of my present invention are therefore the production of a vehicle body embodying the idea of approaching as nearly as practicable to a one piece body structure of such shape that the strains due to road travel while loaded, as well as the vibration caused by travel when unloaded, will be absorbed in the frame and in the shell plates attached to it and these parts will be so designed that the principal distorting stresses will occur on a curved or arched member instead of being transmitted through rectangular joints reinforced by gussets as heretofore.

Another object of the present invention is to provide a structure wherein the number of supporting members are reduced to a minimum and the covering for the sides of the vehicle used as a major factor in the supporting structure.

It is a further object to provide a vehicle transport of pleasing appearance with so-called streamlined shape and partial covering of the structure, said covering effecting the desired shape and appearance while also serving to provide structural strength for support, thus eliminating duplication of members.

Another object is to provide a structure wherein the lower supporting tracks for the carried vehicles are supported at their ends by crossmembers and between said ends by the curved side covering for the vehicle, thus allowing certain portions of the said track members to be underslung with reference to the supporting wheels and main cross bracing members, thus facilitating the loading of the vehicle and reducing its overall loaded height.

It is a further object to provide an upper tilting track section hinged at one end and supported at its other end by an interlocking member to effectively prevent both lateral and longitudinal movement relatively to the lower portion of the vehicle.

A still further object is to so dispose the main bracing frames with relation to the body structure that they will contribute to the strength of the vehicle in resisting endwise stresses which are brought upon the body when loaded, by the sudden starting and stopping of the vehicle, that is the frames, or certain of them, are inclined at a slight forward or rearward angle so that they take not only the vertical loads but also part of the shear load.

A still further object is to so arrange the side walls of the body structure that the sheets, plates or sheathing of the body cooperates with the frame to produce an exceedingly strong girder-like construction which differs from the customary girder structure in that, instead of employing flat plates as heretofore, the plates are curved to conform with the arch of the body and thereby produce a greatly augmented resistance to lateral or buckling stresses while still possessing the requisite capacity for resisting shear. In this manner great strength and resistance to torsion is imparted to the side walls although the frames and the sheathing may be of unusual light material.

The above and other objects will appear more fully from the following more detailed specification and by reference to the accompanying drawings forming a part hereof and wherein:

Figure 1 represents a side elevation of an assembled trailer unit.

Figure 2 is a rear view of the trailer with the rear part of the upper tracks in raised position to permit loading of the lower deck of the trailer.

Figure 3 is a view similar to Figure 2 but showing the rear part of the upper tracks in their normally lowered position for receiving and supporting a car on the upper deck.

Figure 4 is a fragmentary vertical sectional view taken substantially on the line 4—4 of Figure 1 showing the supporting framework, a section of the upper and lower tracks, and one manner of connecting the curved side covering to the lower track.

Figure 5 is a fragmentary sectional view taken substantially on the line 5—5 of Figure 1 showing part of the structure and supporting means for the hinged portion of the upper deck as well as means for facilitating raising of said hinged portion.

Figure 6 is a fragmentary sectional view taken on the line 6—6 of Figure 5 showing a side view of the mechanism for aiding in raising one end of the hinged deck portion, and a ball and socket aligning means between the structural members of the hinged deck portion and the fixed lower part of the vehicle.

Figure 7 is a longitudinal sectional view taken substantially on the line 7—7 of Figure 4 showing the general construction of and part of the support for one of the lower tracks.

Figure 8 is another longitudinal sectional view taken at a point between the lower tracks showing the floor construction of the trailer body and also a connecting means for connecting the trailer to a tractor.

Figure 9 is a fragmentary vertical sectional view taken substantially on the line 9—9 of Figure 1 showing the sheet metal covering comprising the trailer side walls and the longitudinal reinforcing members therefor together with the preferred manner of securing the curved portion of the side wall to a lower track so that it aids in supporting said lower track.

Figure 10 is a fragmentary sectional view taken on the line 10—10 of Fig. 4 showing the manner in which the lower ends of the side frame members are secured to the tracks.

In the foregoing views the invention is shown as a semi-trailer having a body structure of the type adapted to be supported on rear tandem wheels. It will be understood, however, that the body structure shown may be employed with a trailer having a single pair of wheels or with dual wheels or whatever type running gear may be best suited to commercial conditions without departing in any material respect from the invention as set forth in the claims. The body structure may also be incorporated in a full trailer type of vehicle, that is to say, in which there are rear wheels and a pair of front wheels all attached to the vehicle body in known manner, or, with slight modification, it may be embodied in the form of a unitary truck.

As is clearly shown in the drawings (Figs. 1, 2, 3) the body 10 is in the general form of an elongated tunnel shaped structure characterized by having a substantially flat lower deck 11 adapted to carry two or more vehicles and a longitudinal arched upper deck 12 also adapted to carry two or more vehicles. The two decks are connected by upright side walls 13, 14 having their upper and lower marginal portions curved inwardly as shown at 15 and 16 in Fig. 4.

In general the vertical structural members of the body may be considered as being separated into two types, to wit, main frames and intermediate frames. The larger or main frames of which there are four in the body shown, are indicated by the numerals 17, 18, 19, and 20. The intermediate or reinforcing frames are designated 21 and are spaced along the length of the body 10 at intervals between the main frames (see Fig. 1). The main frames are in general upright but certain of them are disposed at an angle or with a slight bias from the vertical for better reinforcing against shear and at the same time to better accommodate and conform to the shape of the cars being shipped.

The general shape of the main frames 18, 19, 20 is that of an inverted U, the top arch of which supports the upper deck. The lower ends of the U-shaped arms are curved inwardly to follow the curvature of the side walls, as at 15, and help support the two tracks upon which the cars constituting the lower deck load are carried.

The upper tracks 22, 23 which constitute a part of the upper deck are mounted on the main frame members and extend somewhat in the form of an arch from the front to the back of the vehicle, said arch having downwardly inclined portions and a substantially horizontal middle portion. One of the downwardly inclined portions 24 of the upper tracks is hinged at one end thereof to the horizontal middle portion and its opposite or free end is arranged so that it can be raised to provide head room when loading cars onto the lower deck.

At the rear end of the body there is provided a frame 17, whose upper ends 25, 26 are adapted to receive and interlock with a pair of brackets 27, 28, which are carried by the hinged portion or section 24. Thus when the hinged section is in its lowered or down position it is effectively supported by the two last mentioned frames and is completely locked against movement relatively to the lower deck and the structure when closed has substantially the strength of an integral frame wherewith to resist road stresses and the like.

It will be noted from Fig. 5 of the drawings that the track sections 22 and 23 are of L-shaped configuration and cross section, thus providing structural members of great rigidity which are capable of supporting fairly large loads without appreciable deformation, as for example, a completely assembled automobile. These track members, as will be seen from Fig. 2, are supported substantially midway between their lengths by the inverted U-shaped cross member 18 and at the rear end thereof by the supporting brackets 27—28, the latter being substantial structures which at their upper end extend across and brace the entire tread section of the track and flare outwardly towards their lower ends to align with the side frame members and with the lowermost portions 27a and 28a of such brackets lying closely adjacent to the side frame members. As a result of this novel construction a large part of the movable upper deck section at the rear thereof is left free from any bracing members which extend entirely across the vehicle so that when an automobile is placed on the rear end of the lower track section and the upper deck is lowered to operative position, the rear end of the upper deck section is capable of straddling an automobile placed on the rear end of the lower deck without striking or marring such automobile or without interfering in any way with the lowering of the hinged upper deck section to its operative automobile supporting position. It will also be noted that those portions of the tracks 22 and 23 which extend rearwardly beyond the central brace 18 form in combination with their respective brackets 27 and 28 rigid structures capable of supporting the required loads and when the brackets 27—28 are interlocked with the projections 25—26 on the lower side frames 17—17, a structure of great lateral and vertical strength and stability is secured without the necessity of employing any cross bracing members such as heretofore always employed at the rear end of the movable deck section; the construction also insuring sufficient strength and stability when the movable deck section is raised to its upper position for loading and unloading.

A shell or sheathing 29 is preferably made of relatively thin sheet metal, say 16 gauge, and is shaped to form a close fitting wall which extends practically as one piece from the inner load margin of the body upwardly around the curved portion, up to and closing the upright sides, and then upwardly and inwardly to the tracks that form a part of the upper deck.

In the foregoing description I have set up in general the principal characteristic features of my improved vehicle body structure. There will now be described in more detail the general construction of the vehicle structure including certain novel features which are set forth in the claims.

As previously mentioned, the reference character 10 designates the body of a trailer unit adapted to be pulled by a tractor vehicle with its front end supported on said tractor, suitable road wheels 50 and 50a with a mounting such as 31 being provided at the rear of the trailer unit. It will be understood that a mounting may be provided for supporting the trailer on any suitable tandem wheel or other running gear unit. The mounting 31 is here shown as built up of a plurality of structural members in the form of channel irons, there being at least one structural member which extends across the bottom of the trailer as shown best in Figs. 1 and 5.

For the purpose of connecting the trailer to a tractor, the trailer is provided at its front end with a fitting 32 (Fig. 8) supported on a cross member 33 which cross member in turn supports the front ends of a pair of inclined lower track sections 34, 35, as shown in Figs. 2, 7, and 8. The entire front end of the trailer is formed as a so-called goose neck portion 36 as is shown in Fig. 1. The track sections 34, 35 extend over the full length of the trailer and are bent to a shape such that there is an underslung or depressed portion 34a and 35a, respectively between the upwardly extending goose neck section just described and the rear support for the track. This rear track support is effected by the wheel mounting members 31 and two transverse structural members 37, 38 which are respectively to the front and rear of the wheel mounting 31, the members 37 and 38 being shown in cross section in Fig. 7. It will be noted that the above described arrangement of the lower tracks 34 and 35 provides two beam-like car supporting tracks which have their opposite ends supported at the front and rear of the trailer unit, the track section being medially bent to form an underslung portion between the two supports. It is also to be noted that the previously mentioned side wall shell or sheathing 29 with its inwardly curved ends, which are secured to the track sections between the end supports, serves as a reinforcement and as an auxiliary support for the track sections in this underslung position. This shell or sheathing 29, as shown in Figs. 1 and 9, is reinforced by longitudinal structural members 39 and 40, the top longitudinal member extending over and beyond the rear of the wheel supporting structure. As shown in Fig. 9, the lower portion of the sheathing may be made up in two sections, an upper flat section 41 and a lower curved section 42, the lower end of the curved section 42 terminating and being secured to the under side of the track members 34, 35.

Figure 10 illustrates the manner in which the lower ends of the side frame members are secured to the tracks. Here, the side frame member 19 is shown connected at its lower end by angle brackets 19a to the track structure 34. The sheathing 29 is shown in engagement with the back of the channel member 19. It will be obvious that the brackets 19a may be riveted, or welded to the frame member 19 and to the track structure 34.

As previously mentioned and as shown particularly in Figs. 2, 3, and 4, there are provided arched main frames 17, 18, 19, 20 and intermediate reinforcing frames denoted generally as 21 which are secured to the sheathing on the inside surface thereof. Thus, the side wall structure with the sheathing serving as a diagonal bracing completes a truss type girder. With the curved lower ends, also covered with sheathing, the side walls make a very strong supporting unit for the underslung portions of the track and for the support of the upper deck structure. It is noted that the side walls of the trailer are supported at their forward ends in the goose neck portion 36 which is in turn supported on the tractor while the rear ends of the side walls are supported on the structure which has a primary support on the rear wheels through the mounting 31. The arched main frames 17, 18, 19, and 20, which extend upwardly and make up a part of the side frames, support the upper deck structure 12 and serve to transfer its load into the side wall structure to be distributed to the front and rear of the trailer by the beam action of the entire side wall structure including the lower curved portion and the lower track members.

As shown in Fig. 4, there is provided a light floor covering 41a between the lower tracks with corrugations to prevent buckling. It is noted that this floor covering is of light construction and serves a very minor part in the structure of the vehicle. A similar covering 42a, see Figure 1, is provided between the upper tracks and is likewise corrugated. The sheathing which covers the sides, as shown in Fig. 1, is extended upwardly to the upper tracks at points where main frames 17, 18, 19, and 20 are located, the sheathing being cut to simulate struts such as are used in aircraft construction. While this sheathing serves a definite purpose in reinforcing the structure, it also serves by its shape to give the trailer a pleasing appearance. The cut out portions between the main frames in the upper portion of the vehicle also serve a useful purpose by giving the driver a better view to the rear when driving than is the case with an entirely closed vehicle. The above arrangement of the strut shaped sheathing between the upper deck and the enclosed portion of the lower deck forms a very substantial bracing for the upper track section and also provides a long joined surface at the top and bottom of the aforementioned strut section, thus affording a very substantial welded joint.

In the front section of the trailer the arched main frame 20 is tilted forwardly so that it is substantially normal to the downwardly curved forward section of the upper deck 12. This tilted position also serves to give adequate clearance for the tops of the cars when they are driven up on the inclined sections of the lower deck tracks 34, 35, as without this tilting the portions of the car would hit the structural members of the arched main frame 20 unless more height was allowed. A similar tilted position is used for the main frame 18 at the rear of the vehicle so that it also is substantially normal to the curved top deck at the point where it is secured.

There is provided a wheel housing 47, as shown in Figs. 1 and 5, made up of an outer channel 48 (Fig. 5) which is curved to the shape shown in Fig. 1 and is riveted or otherwise secured to the side sheathing 41. The member 48 is of sufficient width to provide a recessed portion of a depth to house two tandem wheels 50 and 50a for which the particular trailer illustrated is designed, it being understood that a single wheel might be used by simply changing the shape and size of the recess. As shown in Figs. 1 and 5, an inner wall is provided by a sheet metal covering 49 and a triangular member 51 is provided as a central support. The entire back wall made up of the sheet 49 is supported at its top edge on the rear flange of the member 48 by suitable rivets and at its lower end connects to a flanged extension 52 of the lower track member 34 or 35.

As also shown in Fig. 5, the arched main frame 18 extends upwardly from the member 48 and is provided with a joint shown at 53. This joint is here shown as a ball and socket joint, the socket being in the upper arched portion 18A of the frame and the ball being secured in the lower portion 18B, although the reverse construction is optional. The arched section 18A above the joint 53 is, as previously mentioned, secured to the downwardly inclined portion of the upper track and serves as a structural support for the tilting upper track portion.

The upper track members on the downwardly inclined portion 24 extend downwardly at the rear of the trailer as shown in Fig. 1 and each is provided with a hinge as shown at 54. This construction makes it possible to swing the track upwardly as shown in Fig. 2 to allow a car to be driven onto the lower tracks of the trailer. The ball and socket connection 53 between the members 18A and 18B serves to provide a quick means for disconnecting the supporting structure or providing a positive location thereof for supporting the load of the upper track. For the purpose of assisting and guiding this upward movement of the tilting track section 24 there is provided a toggle unit denoted generally as 56 (Figs. 5 and 6) and having two arms 57, 58, the arm 57 being secured to the frame member 18A and the arm 58 being secured to the lower portion of the trailer on member 48. At the joint between these two arms a spring 59 is secured and mounted in a substantially horizontal position with its opposite end secured to the trailer by fitting 61. The spring 59 is in its extended position when the upper track section 24 is in its downward location and because of the tension exerted by the spring on the center pivot between the arms 57 and 58, the spring 59 assists the upward movement of the track section 24 and therefore a much less upward push is required than would otherwise be necessary. It is understood that the toggle unit 56 is duplicated on the opposite side of the trailer. This toggle unit is of the type more completely described in my co-pending application Serial No. 63,719, filed February 13, 1936.

Considering Figs. 2 and 3, a construction is shown for supporting the rear end of the tilting upper track section 24 comprising the previously mentioned brackets 27, 28 which make up the upper end of the frame 17. The upper end of the lower portion of the upper frame 17 is formed in the shape of projections 25 and 26 which fit into appropriately shaped recesses 25a and 26a in the brackets 27 and 28, the brackets being also provided with long projections 27a and 28a adapted to fit against the members 17 when the frame is in its downward position as shown in Fig. 3, this serving to rigidly secure the top deck member 24 in position. It is apparent that the ball and socket joint 53 in the frame 18, together with the joint just described in the frame 17, provides for rigid support of the tilting upper track when in its downward position against both longitudinal and lateral movement, the ball and socket joint and the frame 18 serving to support the section 24 near its central position and the frame 17 with its laterally guided and resistant interlocking joint serving to resist lateral movement and to support the rear section of the upper deck structure. The two connections together serve to adequately support the hinged upper track section 24 while still affording a quick means for disconnecting the supports when it is desired to raise the hinged section.

It is especially to be noted that the usual lower corner construction of longitudinal structural shapes is dispensed with in this type of trailer construction and for the most part this conventional structural corner unit has been replaced by the tracks which carry the cars and a curved side section of the trailer itself. It is necessary in this type of vehicle to provide sides which are considerably displaced from the track sections in order that sufficient room be provided to drive a car onto the load carrying tracks. If this were not the case it would be possible to build the sides of the trailer vertically from the load carrying track members and use these track members as the main structural load carriers as well as to shape the sides of the trailer which must eventually support the upper tracks. However, in this construction the necessity of a wider trailer than is afforded by the outside line of the tracks is provided by a curved side construction which does, in effect, connect directly with the tracks but provides both a support for the upper tracks and is sufficiently displaced to allow the necessary width. The curved construction of the lower corner also affords the use of a covering which, while it gives the desired appearance, also is useful to carry part of the loads.

In practice the vehicle carried upon the upper deck, under conditions of road use develops wrenching stresses or torque stresses of a character unusual in ordinary vehicles. For instance, if the rear wheels on one side run over a high obstruction they tend to tilt the rear part of the body, and the rear automobile on the upper deck wrenches the body at the mid portion of its length. Similarly if one of the rear wheels of the truck to which the trailer is attached runs off the pavement and drops down upon a low shoulder the front automobile on the upper deck of the trailer will cause a somewhat similar wrenching of the body. When the loading vehicle is driven rapidly around a sharp turn, the centrifugal force produced by the first car on the upper deck tends at the curve, to twist the front part of the body and that is immediately followed by wrenching of the rear part of the body when the rear automobile comes into the curve.

In addition to the foregoing type of stresses or torques the body is subjected to vibrations caused by road chatter marks. This type of vibration is not now as detrimental as it was in former types of haulaway vehicles because of recent improvements in the spring mounting of the wheels of the trailer. A very satisfactory mounting is shown and claimed in my co-pending application Serial No. 62,754, filed February 7, 1936.

All of the foregoing types of vibrations and twists that tend to rotate the body about its longitudinal axis unequally and in an indeterminate manner will be effectively withstood by the structure herein described, notwithstanding that the frame work including the main frames and the smaller intermediate frames can be made of unusually light material and of such cross-sectional shapes as to cause a minimum amount of load space to be occupied by the vehicle.

My improved construction, which departs from the conventional rectangular cross-sectional shape of the lower part of the body and also uses a similar curved shape for the upper part, results in a body that is approximately circular in its general cross-sectional shape, that is, the lower deck at its juncture with the side walls makes curves instead of sharp corners, and the side edges of the upper deck are similarly curved. This approximate circular cross-sectional shape is shown in its preferred form in the drawings Figs. 2, 3, 4, 5, and 9.

Although I have described my invention as applied to a specific type of construction, it is understood that I do not desire to limit myself to the details of such construction and it is understood that variations and modifications can be made without departing from the principles disclosed herein as indicated by the scope of the following claims.

I claim:

1. In a vehicle for transporting a plurality of fully assembled automobiles, a pair of side frame members extending longitudinally of said vehicle; vertical members forming a part of said side frame members and having their lower ends turned inwardly, and longitudinally extending track members connected with the inwardly turned ends of said vertical members to form a deck for supporting fully assembled automobiles.

2. In a vehicle for transporting a plurality of fully assembled automobiles, a pair of side frame members extending longitudinally of said vehicle and having lower ends curved inwardly, wheels supported by said side frame members, a cross frame extending between the lower ends of said side frame members near the rear end of the vehicle, a second cross frame extending between the vertical side frame members at the front of the vehicle, and track members having their ends supported by said first and second cross frames and connected intermediate their ends with said inwardly turned lower ends of said side frame members.

3. In a vehicle for transporting a plurality of fully assembled automobiles, a pair of side frame members extending longitudinally of said vehicle, vertical members extending upwardly from said side frame members, an upper car carrying deck extending longitudinally of said vehicle and supported by said vertical members, a hinged rear section forming a part of said upper deck, a supporting frame for said hinged section, a projection on said frame for interlocking with said side frame to brace the same against longitudinal movement, and a pair of brackets secured to the end of said hinged section and shaped to interlock with said side frame members to brace said upper deck against lateral movement relative to said side frame members.

4. In a vehicle for transporting a plurality of fully assembled automobiles, side frame members inwardly curved at their lower ends, a cross frame at the rear of said vehicle, road wheels under said cross frame, a second cross frame member at the front of said vehicle, and car supporting tracks supported by said cross frames and connected with and reinforced by the curved lower ends of said side frames.

5. In a vehicle for transporting a plurality of fully assembled automobiles, side frame members inwardly curved at their lower ends, a cross frame at the rear of said vehicle, a second cross frame at the front of said vehicle, and car supporting tracks supported at their ends by said cross frames, said tracks being so shaped as to provide a car supporting platform lower at the central portion of said tracks, said central portion being supported on the lower ends of said inwardly curved side frame members.

6. In a vehicle body of the character described, a frame member of inverted U form, the lower free ends of the legs of said frame being curved inwardly and downwardly, and a pair of vehicle supporting tracks secured to the free ends of the curved portions aforesaid and extending lengthwise of the vehicle substantially perpendicular to the plane defined by said frame member.

7. In a vehicle body of the character described, a frame of inverted U form, the lower free ends of the legs of the frame being curved inwardly and downwardly, sheathing fixed to the exterior of the frame and following the curved contour of the lower ends thereof, and a pair of tracks, said sheathing being secured along its lower marginal edges to the respective tracks.

8. In a vehicle body of the character described, a pair of inverted U-shaped frames spaced apart lengthwise of the vehicle, the lower free ends of said frames being curved inwardly and downwardly, a pair of vehicle supporting tracks secured to the free ends of the curved portions aforesaid and extending lengthwise of the vehicle, and sheathing fixed to the exterior of the frames and following the curved contour of the lower ends thereof and secured along its lower marginal edges to the respective tracks.

9. A vehicle body of the class described having an upper deck provided with vehicle carrying tracks, an end section of said upper deck and tracks being hinged to the upper deck at a point remote from an end thereof, said hinged section including aligning and supporting means comprising an upright frame, said frame being of substantially inverted U shape and located intermediate the ends of said hinged section, the legs of said frame each comprising an upper part carried by said hinged section and a lower part secured to the body, and interlocking centering means for releasably connecting the upper and lower parts of each leg.

10. A vehicle body including a frame of inverted U form, the lower free ends of the legs of said frame being curved inwardly and downwardly, and trough shaped track members secured to the free ends of the curved leg portions and extending lengthwise of the vehicle.

11. In a vehicle body comprising an upper deck having vehicle-carrying tracks thereon and side wall structures supporting said deck, said side wall structures comprising upright members spaced apart lengthwise of the vehicle, sheathing connecting said upright members and secured thereto, the lower marginal portions of said sheathings being curved inwardly and downwardly, tracks secured to the lower end portions of the upright members and extending lengthwise of the vehicle, the upper portions of said frames at opposite sides of the vehicle body being bent inwardly and upwardly so as to present an arch-like supporting element for said upper deck, said upper and lower decks and said side walls together constituting a body approximately circular in its general cross-sectional shape and adapted to withstand torque stresses which are developed under road transport conditions by loads carried upon the upper deck, said stresses being of a character tending to rotate the body about its longitudinal axis unequally and indeterminately at different portions of its length.

12. A device of the character described comprising an upper deck and a lower deck, a pair of transversely spaced track sections carried by each of said decks, said track sections forming the main structural members of said decks, side frames extending between said upper and lower decks and spaced outwardly from said track sections to provide clearance space between said track sections and the inner walls of said side frames, said side frames being provided along their upper and lower longitudinal edges with curved portions extending from a flat portion of the side frames and being connected at their lower ends directly to said track sections.

13. An automobile transporting vehicle comprising an upper deck and a lower deck and a pair of side frame members connecting said decks, each of said side frame members consisting of a substantially vertically extending portion having at the lower section thereof a longitudinally extending truss comprising a plurality of vertically extending struts, diagonal members, and a relatively thin sheet wall section, said trusses at their lower ends being provided with inwardly curved sections formed by projections of said struts and thin sheet wall section, and means uniting the inner lower ends of said curved sections directly to the tracks of said lower deck whereby said tracks are suspended from said truss and form therewith a substantially unitary main structural element of said vehicle.

14. A device of the character described comprising an upper deck and a lower deck, a pair of transversely spaced track sections carried by each of said decks, side frames extending between said upper and lower decks, said side frames having inwardly curved ends connected directly with said tracks whereby said side frames are spaced outwardly from said tracks to provide clearance for cars carried on said lower deck.

15. A device for transporting automobiles comprising an upper deck and a lower deck, a pair of track sections carried by each deck, said tracks being spaced to receive the wheels of automobiles to be carried, said track sections forming the main structural members of said decks, side frames extending between said upper and lower decks, said side frames comprising longitudinal and vertical members, a sheet metal covering for said side frames forming a structural girder with said longitudinal members, the lower ends of said vertical members of said side frames being curved inwardly and secured to said track sections.

16. In a trailer for transporting automobiles behind a tractor vehicle, a forward cross frame supporting structure adaptable for support on a tractor, road wheels for said trailer, a rear cross frame structure arranged and constructed so that it can be carried by said road wheels, tracks spaced apart a distance to receive wheels of automobiles to be carried and having their end portions supported on said front and rear cross frames, said tracks being bent to form an underslung central portion substantially lower than the said end portions, and side frames being supported adjacent their ends by said front and rear cross frames, said side frames having inwardly curved lower ends secured to said tracks to provide support therefor at said underslung central portion.

17. In a vehicle for transporting a plurality of fully assembled automobiles, side frame members having inwardly curved lower ends, a cross frame at the rear of said vehicle, road wheels under said cross frame, a second cross frame member at the front of said vehicle, tracks spaced to receive automobiles and having end portions supported on said front and rear cross frames and shaped to provide an underslung central portion substantially lower than the said end portions, and means securing said inwardly curved lower ends of said side frame members to said tracks so that they support said central underslung portions of said tracks.

18. A device of the character described comprising a lower deck and an upper deck curved downwardly from its center toward the opposite ends thereof, a pair of transversely spaced track sections carried by each of said decks, said track sections forming the main longitudinal structural members of said decks, side frames extending between said upper and lower decks and spaced outwardly from said track sections to provide clearance space between said track sections and the inner walls of said side frames, said side frames including frame members supporting said curved parts of said upper deck and positioned substantially normal to the curvature of said deck.

19. A device of the character described comprising a lower deck and an upper deck curved downwardly from its center toward the opposite ends thereof, a pair of transversely spaced track sections carried by each of said decks, said track sections forming the main longitudinal structural members of said decks, and side frame members extending between said upper and lower decks and providing support for said upper deck, said side frame members being secured to said upper track members and positioned substantially normal to the curvature of said deck.

20. In a vehicle for transporting a plurality of fully assembled automobiles, a pair of side frame members extending longitudinally of said vehicle, vertical members extending upwardly from said side frame members, a lower car carrying deck secured to the lower ends of said side frame members, an upper car carrying deck extending longitudinally of said vehicle and supported by said vertical members, a hinged rear section forming a part of said upper deck and having a pair of automobile supporting track sections one at each side of said hinged rear section, each track section having a cross sectional configuration of structural shape, a pair of supporting brackets one for each of said track sections, secured to the lower face of each track section adjacent to the rear end thereof, said brackets flaring outwardly at their lower ends to register with said side frame members, said side frame members and the lower ends of said brackets being provided with cooperating interlocking means to secure said hinged upper deck section against lateral movement when in its lowered position and the rear ends of said track sections and said brackets forming an open U-shape at the end of said hinged upper deck section free from transverse bracing members to provide ample clearance between said upper deck section and an automobile loaded on the rear end of said lower car carrying deck.

LYNN M. FRANCIS.